(12) United States Patent
Phibbs, Jr.

(10) Patent No.: US 7,263,503 B1
(45) Date of Patent: Aug. 28, 2007

(54) CAPITAL ALLOCATION IN A NET INTEREST REVENUE IMPLEMENTATION FOR FINANCIAL PROCESSING IN A RELATIONAL DATABASE MANAGEMENT SYSTEM

(75) Inventor: Paul H Phibbs, Jr., Escondido, CA (US)

(73) Assignee: NCR Corporation, Dayton, OH (US)

( * ) Notice: Subject to any disclaimer, the term of this patent is extended or adjusted under 35 U.S.C. 154(b) by 954 days.

(21) Appl. No.: 09/943,060

(22) Filed: Aug. 30, 2001

Related U.S. Application Data

(63) Continuation-in-part of application No. 09/608,355, filed on Jun. 29, 2000, and a continuation-in-part of application No. 09/610,646, filed on Jun. 29, 2000.

(60) Provisional application No. 60/253,254, filed on Nov. 27, 2000, provisional application No. 60/253,281, filed on Nov. 27, 2000.

(51) Int. Cl.
*G06Q 40/00* (2006.01)

(52) U.S. Cl. ...................................................... 705/35

(58) Field of Classification Search .................. 705/35, 705/36, 38, 8, 30
See application file for complete search history.

(56) References Cited

U.S. PATENT DOCUMENTS 5,189,608 A * 2/1993 Lyons et al. .................. 705/30

(Continued)

FOREIGN PATENT DOCUMENTS

EP 1208495 * 10/2000

OTHER PUBLICATIONS

Curley, Bob, "Royal Bank unearths profitability solution," Bank Systems & Technology, Apr. 2000, 2 pages.*

(Continued)

*Primary Examiner*—Andrew Joseph Rudy
(74) *Attorney, Agent, or Firm*—Gates & Cooper LLP

(57) ABSTRACT

A financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| Profit | = | Net Interest Revenue (NIR) |
|---|---|---|
| | + | Other Revenue (OR) |
| | − | Direct Expense (DE) |
| | − | Indirect Expense (TE) |
| | − | Risk Provision (RP) |

In this calculation, the Net Interest Revenue (NIR) comprises:

| NIR | = | Interest Revenue |
|---|---|---|
| | − | Cost of Funds |
| | + | Value of Funds |
| | − | Interest Expense |
| | + | Earnings on Allocated Equity |

The Earnings on Allocated Equity includes an identification of how much equity to allocate to the accounts, and one or more rates used in the calculation of the NIR due to the allocation.

15 Claims, 4 Drawing Sheets

U.S. PATENT DOCUMENTS

| | | | | |
|---|---|---|---|---|
| 5,237,498 | A * | 8/1993 | Tenma et al. | 705/30 |
| 5,249,120 | A | 9/1993 | Foley | |
| 5,615,109 | A * | 3/1997 | Eder | 705/8 |
| 5,655,085 | A * | 8/1997 | Ryan et al. | 705/4 |
| 5,701,400 | A | 12/1997 | Amado | |
| 5,712,987 | A | 1/1998 | Waits et al. | |
| 5,721,831 | A | 2/1998 | Waits et al. | |
| 5,819,237 | A | 10/1998 | Garman | |
| 5,911,135 | A | 6/1999 | Atkins | |
| 5,991,743 | A | 11/1999 | Irving et al. | |
| 6,026,382 | A | 2/2000 | Kalthoff | |
| 6,085,175 | A | 7/2000 | Gugel et al. | |
| 6,112,190 | A * | 8/2000 | Fletcher et al. | 705/38 |
| 6,233,566 | B1 | 5/2001 | Levine et al. | |
| 6,240,399 | B1 | 5/2001 | Frank et al. | |
| 6,249,770 | B1 * | 6/2001 | Erwin et al. | 705/10 |
| 6,253,192 | B1 | 6/2001 | Corlett et al. | |
| 6,275,813 | B1 | 8/2001 | Berka | |
| 6,292,787 | B1 | 9/2001 | Scott et al. | |
| 6,343,272 | B1 * | 1/2002 | Payne et al. | 705/4 |
| 6,360,210 | B1 * | 3/2002 | Wallman | 705/36 |
| 6,389,380 | B1 * | 5/2002 | Bankes | 703/17 |
| 6,393,406 | B1 * | 5/2002 | Eder | 705/7 |
| 6,477,510 | B1 * | 11/2002 | Johnson | 705/30 |
| 6,571,219 | B1 * | 5/2003 | Spivey | 705/36 |
| 2002/0026394 | A1 * | 2/2002 | Savage et al | 705/34 |

OTHER PUBLICATIONS

John R. Johnson, Raising Relationships, Bank Marketing, Jun. 1999, pp. 30-36, footnote 1.*
John R. Johnson, Raising Relationships, Bank Marketing, Jun. 1999, pp. 16-24.*
Kassing, Jay, "Profitability: Growing the Bottom Line," CSI, 1999, 43 pages.
"Canadian Bank Mines for Data-based Gold," Action Items, Dec. 2, 1997, 2 pages.
"Bank of Ireland Selects Compaq AlphaServers to Help Improve Profitability Management," Dec. 3, 1998, Compaq, 2 pages.
"Marquis Tops 300 MCIF-CRM Data Mart Clients Worldwide," Apr. 18, 2000, 2 pages.
Curley, Bob, "Royal Bank unearths profitability solution", Bank Systems & Technology, Apr. 2000, 2 pages.

* cited by examiner

CAPITAL ALLOCATION IN A NET INTEREST REVENUE IMPLEMENTATION FOR FINANCIAL PROCESSING IN A RELATIONAL DATABASE MANAGEMENT SYSTEM

CROSS REFERENCE TO RELATED APPLICATIONS

This application claims priority under 35 U.S.C. §119(e) to the following co-pending and commonly-assigned patent applications:

Provisional Application Ser. No. 60/253,254, entitled "ALLOCATED BALANCES IN A NET INTEREST REVENUE IMPLEMENTATION FOR FINANCIAL PROCESSING IN A RELATIONAL DATABASE MANAGEMENT SYSTEM," filed on Nov. 27, 2000, by Paul H. Phibbs, Jr.; and Provisional Application Ser. No. 60/253,281, entitled "CAPITAL ALLOCATION IN A NET INTEREST REVENUE IMPLEMENTATION FOR FINANCIAL PROCESSING IN A RELATIONAL DATABASE MANAGEMENT SYSTEM," filed on Nov. 27, 2000, by Paul H. Phibbs, Jr.;

both of which applications are incorporated by reference herein.

This application is a continuation-in-part that claims priority under 35 U.S.C. §120 to the following co-pending and commonly-assigned patent applications:

Utility application Ser. No. 09/608,355, entitled "ADVANCED AND BREAKTHROUGH NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.; and Utility application Ser. No. 09/610,646, entitled "BASIC AND INTERMEDIATE NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.;

both of which applications are incorporated by reference herein.

This application is related to the following co-pending and commonly-assigned patent application:

Utility application Ser. No. 09/608,681, entitled "OTHER REVENUE IMPLEMENTATION FOR FINANCIAL PROCESSING IN A RELATIONAL DATABASE MANAGEMENT SYSTEM," filed on Jun. 29, 2000, by George Robert Hood;

Utility application Ser. No. 09/608,675, entitled "DIRECT EXPENSE IMPLEMENTATION FOR FINANCIAL PROCESSING IN A RELATIONAL DATABASE MANAGEMENT SYSTEM," filed on Jun. 29, 2000, by George Robert Hood;

Utility application Ser. No. 09/608,342, entitled "INDIRECT EXPENSE IMPLEMENTATION FOR FINANCIAL PROCESSING IN A RELATIONAL DATABASE MANAGEMENT SYSTEM," filed on Jun. 29, 2000, by George Robert Hood;

Utility application Ser. No. 09/608,682, entitled "RISK PROVISION IMPLEMENTATION FOR FINANCIAL PROCESSING IN A RELATIONAL DATABASE MANAGEMENT SYSTEM," filed on Jun. 29, 2000, by George Robert Hood; and Utility application Ser. No. 09/943,059, entitled "ALLOCATED BALANCES IN A NET INTEREST REVENUE IMPLEMENTATION FOR FINANCIAL PROCESSING IN A RELATIONAL DATABASE MANAGEMENT SYSTEM," filed on Aug. 30, 2001, by Paul H. Phibbs, Jr.;

BACKGROUND OF THE INVENTION

1. Field of the Invention

This invention relates in general to financial processing systems performed by computers, and in particular, to the use of capital allocation in "net interest revenue" calculations for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems attempt to use profitability calculations to differentiate between sources of revenues and expenses. There is a need, then, for a flexible approach to profitability calculations in terms of the overall metric, as well as the type of data used.

SUMMARY OF THE INVENTION

A Value Analyzer is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

In this calculation, the Net Interest Revenue (NIR) comprises:

| | | |
|---|---|---|
| NIR | = | Interest Revenue |
| | − | Cost of Funds |
| | + | Value of Funds |
| | − | Interest Expense |
| | + | Earnings on Allocated Equity |

The Earnings on Allocated Equity includes an identification of how much equity to allocate to the accounts, and one or more rates used in the calculation of the NIR due to the allocation.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
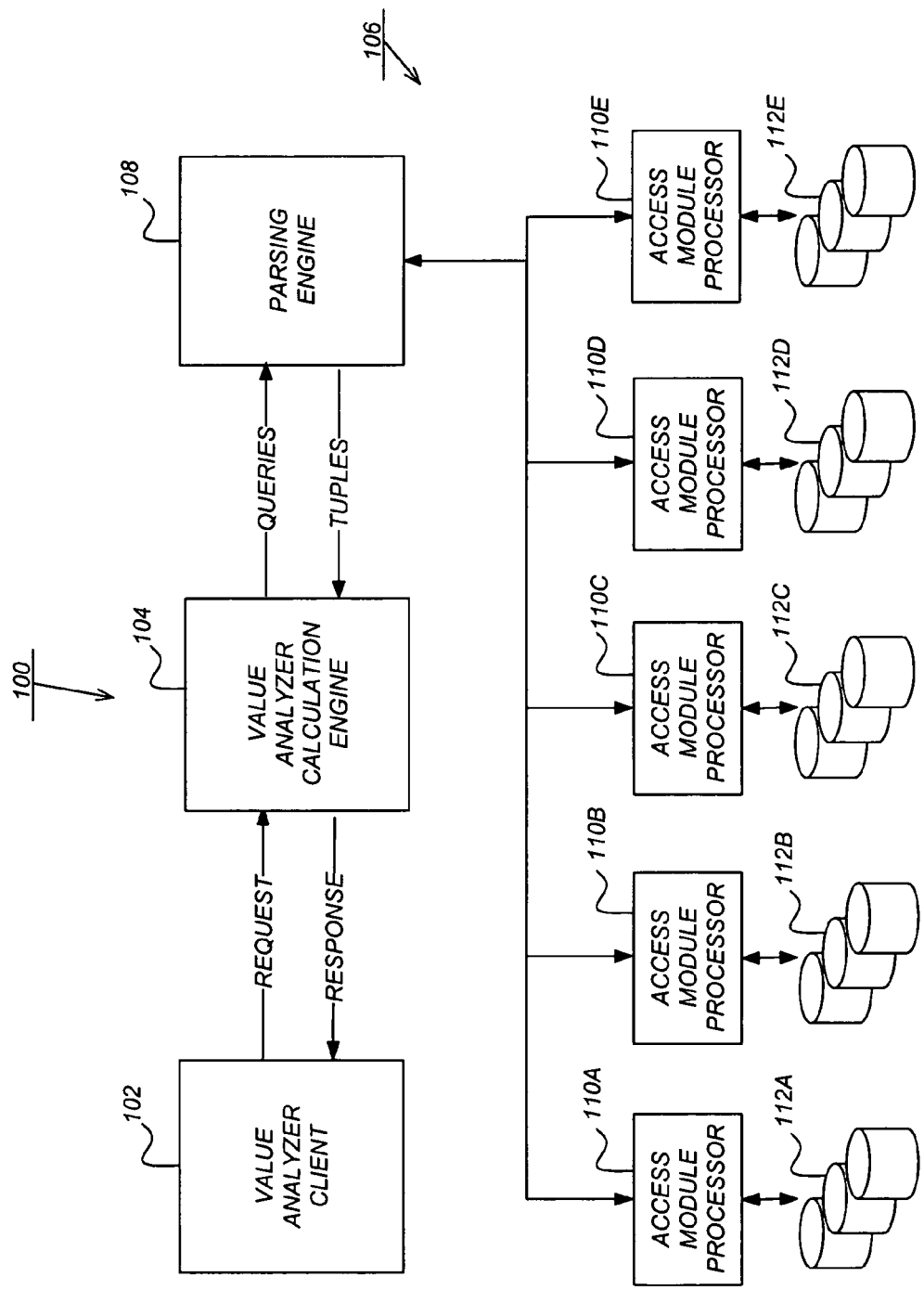
FIG. 1 illustrates an exemplary hardware and software environment according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The Value Analyzer is a data-driven computer-facilitated financial model that provides accurate and consistent profitability calculations using account, event and organization data stored in a relational database management system (RDBMS), wherein: (1) the account attributes comprise data about accounts being measured, (2) the event attributes comprise data about account-related transactions, and (3) the organization attributes comprise data about the organization's financial status. The profitability calculations performed by the Value Analyzer rely on a Five Factor Atomic Profit Metric (FFAPM):

|   |   |   |
|---|---|---|
| Profit | = | Net Interest Revenue (NIR) |
|   | + | Other Revenue (OR) |
|   | − | Direct Expense (DE) |
|   | − | Indirect Expense (TE) |
|   | − | Risk Provision (RP) |
|   | + | NIR + OR − DE − IE − RP |

In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprises expenses driven by events that are attributable to accounts.

Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in a relational database management system (RDBMS). There are three aspects to this:

components of profitability may be measured below the account level (at events which make up account activity over an accounting period) and accumulated to the account, components of profitability may be measured directly at the account level (such as interest paid or earned for an accounting period), components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Hardware and Software Environment

FIG. 1 illustrates an exemplary hardware and software environment according to the preferred embodiment of the present invention. In the exemplary environment, a computer system 100 implements a financial processing system in a three-tier client-server architecture, wherein the first or client tier provides a Value Analyzer Client 102 that may include, inter alia, a graphical user interface (GUI), the second or middle tier provides a Value Analyzer Calculation Engine 104 for performing profitability calculations as described later in this application, and the third or server tier comprises a Relational DataBase Management system (RDBMS) 106 that stores the data and metadata necessary for performing the profitability calculations from the data and metadata stored in a relational database. The first, second, and third tiers may be implemented in separate machines, or may be implemented as separate or related processes in a single machine.

In the preferred embodiment, the Value Analyzer Client 102 and the Value Analyzer Calculation Engine 104 together are referred to as the Value Analyzer. Generally, the Value Analyzer Client 102 includes a graphical user interface (GUI) for operators of the system 100, wherein requests are transmitted to the Value Analyzer Calculation Engine 104 and responses are received therefrom. The Value Analyzer Calculation Engine 104 performs the profitability calculations and other processing, including commands or functions for performing various search and retrieval functions in the RDBMS 106, wherein queries are transmitted to the RDBMS 106 as requests and tuples are received therefrom as responses. The Value Analyzer Client 102 and the Value Analyzer Calculation Engine 104 may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMSs could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Data Flow

Figure 2:
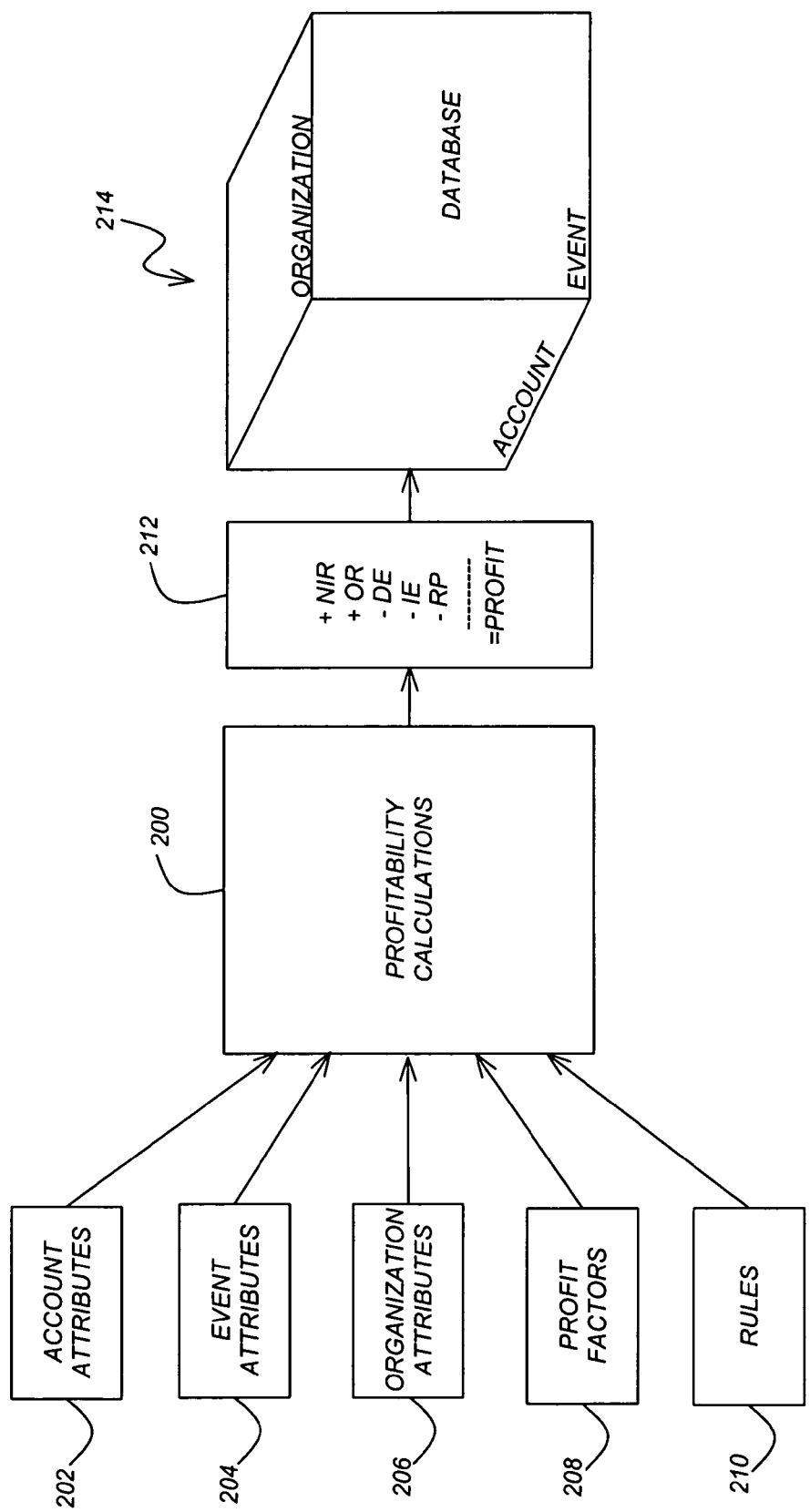
FIG. 2 is a data flow diagram that illustrates the operation of the Value Analyzer according to the preferred embodiment of the present invention.

FIG. 2 is a data flow diagram that illustrates the operation of the Value Analyzer Calculation Engine 104 according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

Funds transfer rates are pricing methods that require matched maturity opportunity rates for use in valuing each account's marginal use or source of internal funds.

Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished).

Allocated amounts are used in both Other Revenue and Indirect Expense calculations, wherein the allocated amounts are apportioned amongst all accounts in a group.

Miscellaneous calculation values may comprise, for example, the number of days in a profit measurement period, an equity allocation weighting, etc. These values are known as "modeling" parameters.

Amortization parameters are used in interest amortization, which requires interest rates and life values used by straight line amortization and by declining balance of amortization.

Risk measurement parameters are used in Risk Provision calculations, which require various factors, such as: loss rates, reserve percentages, exposure factors, recovery rates, default probabilities and collection costs.

Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting an organization's balance sheet requires a method of valuing the account's use of internal funds. One approach is "matched maturity Funds Transfer Pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocations, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer is designed to reconcile to the financial statement's profit values, it supports deferral and accrual accounting principles. Amortization methods that account for these timing differences are: interest amortization (used for Interest Revenue and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied. These rules allow for multiple profit calculations rules to be applied to derive multiple account level Indirect Expense amounts.

Risk Provision. Adjusting current profit for expected future losses is known as "actuarial" profit provisioning. The Value Analyzer applies actuarial-based methods in its account level profit calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer can calculate profits for any number of periods, the adjustment of cash interest payments, and the financial statement's accrual or smoothed representation of interest-related Profit, the Value Analyzer provides a method for converting cash interest amounts to accrual amounts for financial statements. The Value Analyzer implements an "effective interest rate" conversion to accomplish this type of calculation.

Profitability Calculations

The following describes the method used by the Profit Calculations 200:

1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profit Calculations 200 generate one or more values for the five factors of the FFAPM 212, and specifically, the NIR, OR, DE, IE, RP, and Profit values. These values are used to generate the output data 214, which can be stored by the RDBMS 106 in the relational database.

Analytic Variations

The Value Analyzer operates on data and calculations across a continuum, in order to provide the analytic variations necessary for financial processing at various levels of aggregation. This continuum is comprised of multiple tiers as described below:

basic→intermediate→advanced→breakthrough.

Not every tier is necessarily present for each element of data or every calculation.

This continuum embodies the notion of inheritance, wherein the data and calculations of the higher tiers embody the data and calculations of the lower tiers. The principle of inheritance means that the data and calculations by which the separate tiers are defined are nested, i.e., the definition of "intermediate" includes the definition of "basic," but with added functionality that goes beyond "basic," and so on. Thus, there is consistency in the data and calculations performed at the different tiers in the continuum.

Net Interest Revenue

Generally, Net Interest Revenue (NIR) is defined by the following calculation:

| NIR | = | Interest Revenue |
|---|---|---|
| | − | Cost of Funds |
| | + | Value of Funds |
| | − | Interest Expense |
| | + | Earnings on Allocated Equity (optional) |

These various elements (and sub-elements thereof) are described in more detail below.

Net Interest Revenue is calculated for every account based on the account's use of the balance sheet (funds used or provided). The Net Interest Revenue thus represents the total interest made from all deposit and lending activities (income less expenses).

Net Interest Revenue is designed to enable a common incremental measurement of return across a balance sheet using products, services, customers, and accounts, as each usage is valued against the opportunity of using the same funds in the marketplace, defined as the wholesale market yield curve. This ensures that analysis of returns is consistent and comparable.

Capitol Allocations

For most Financial Institutions, it has been assumed that funds for lending are borrowed from the wholesale/interbank market, and deposits are placed in the inter-bank/wholesale market. This approach does not reflect the value of the Financial Institutions' equity as a source of funds. Some Financial Institutions will not adjust the internal profit measure for the value of equity as a source of funds or include the profit measure's effect only in the profit arising from activities of the Treasury Department for the Financial Institution. For Financial Institutions that want to include the value of funding by equity, the Value Analyzer provides this capability at the account level. The appropriate level of equity funding can be complicated; in line with the Value Analyzer's continuum approach, the most basic method would be to use a constant ratio to the break-through use of economic techniques that would allocate equity based on the risk of the account.

Earnings on Allocated Equity

Earnings on Allocated Equity (EOAE) represents the NIR impact from equity funding. The appropriate interest rates will be a Financial Institution specific issue. Generally, only loan spreads are adjusted for Earnings on Allocated Equity; however, sophisticated Financial Institutions may want to allocate equity to deposit gathering activities, since they are not risk free.

NIR Equity Allocation Options—Calculation of EOAE

The EOAE component of NIR accounts for the dynamics associated with equity. Assuming the Financial Institution chooses to compute this factor, there are two aspects to this analysis: the EOAE includes an identification of how much equity to allocate to the accounts, and one or more rates used in the calculation of the NIR due to the allocation.

An Example

This is an example of a calculation of equity as part of NIR. The example is used in two ways: the first uses the Value Analyzer to calculate non-EOAE components of NIR, and the second uses an allocated hedge cost. Both approaches produce the same numeric result.

Assume a bullet loan of $100 for 1 year at 12%, with a Cost of Funds rate of 10%, a 5% capital ratio, a 10.5% earning rate on equity, which is a treatment rate, like that used in the Value Analyzer for Cost of Funds. The Financial Institution could use the same rate as the Cost of Funds for the account, a blended treatment based on the Cost of Funds, or another rate according to Treasury guidelines. Note that the Cost of Funds transfer rate and earning rate on equity will be supplied by the Treasury Department of the Financial Institution and will not be required to be calculated in the Value Analyzer; the other values are supplied to the Value Analyzer from the account information in the system. Then, in the calculation of Net Interest Revenue, the following is provided:

Calculated in the Value Analyzer

The following is calculated as part of NIR:

| | | |
|---|---|---|
| Interest Income = | $100 * 12% = | $12.00 |
| Cost of Funds = | $100 * 10% = | $(10.00) |

The following is an adjustment option for overstating the Cost of Funds:

| | |
|---|---|
| EOAE = $100 * 5% Equity * 10.5% = | $0.525 |
| Total Net Revenue = | $2.525 |

Alternative Calculation of the NIR

If it is assumed that the same rates and variable values are used as defined above, the bank funds $95 of a $100 loan with wholesale funds and $5 through equity (which has no NIR-related cost associated with it). Then:

| | |
|---|---|
| Equity Allocation = | $5.00 |
| Loan Amount = | $100.00 |
| Market Funding = | $95.00 |
| NIR = + Interest Income ($100 * 12%) = − | $12.00 |
| Cost of Funds, non equity ($95 * 10%) = + | $9.50 |
| Hedge cost for use of Equity = | 0.025 |
| | $2.525 | where the hedge cost is calculated and supplied by the Treasury Department of the Financial Institution. If this is known, the transfer rate to use for equity in the Value Analyzer calculation could be computed back to 10.5% for use in the previous approach (2.5 basis points on 5% equity ratio, or 0.5% addition to the 10% Cost of Funds rate, giving a 10.5% equity transfer rate). Note that the hedge cost for the use of equity can be positive or negative depending on the shape of the yield curve.

The profit declines if other costs are added into the equation; but this example is simplified to show the basic calculation components. As an aside, at the account level, note that, for this simplified example, the calculated (pre-tax) return on equity is $2.525/($100.00*0.5)=52%, where the denominator is the allocated equity on this revenue. Similarly, the (pre-tax) return on assets is simply $2.525/$100.00=2.525%.

The Value Analyzer Approach to Allocating Equity

Four options are provided for Financial Institutions to select in allocating equity to accounts. The expectation is that these options will be closely related to continuum considerations, although any alternative can be used regardless of continuum position for computing the other components of NIR. Note that EOAE is calculated only for "asset" balance types in Options 2 and 3, and then is of opposite sign to the Cost of Funds.

The four options are as follows:

Option 1: No calculation of EOAE. The term is set to zero.

Option 2: EOAE calculation based on a simple equity ratio, taken from book value for equity or other Financial Institution-entered value, with no allowance for equity risk.

Option 3: an allocation of equity for all assets following one or more regulatory standards, such as from the Bank of International Settlements (BIS).

Option 4: an allocation of equity using an external economic allocation rule, based on account cohorts and modern portfolio theory's capital asset pricing model.

Capitol Allocations—Simple Equity Ratio

EOAE Calculation Option 2

| Account-Level Inputs | Account-Level Outputs |
|---|---|
| For the Account: | Earnings on Allocated |
| Average Asset Balances, including Float and Allocated Balances | Equity for each Balance |
| User-entered Ratio, usually the Book Equity Ratio | |
| Treatment Rate$_{equity}$ = R$_{equity}$ | |

In this case, the equity allocation rule is simply multiplication by the Financial Institution-entered equity ratio (typically the Book Equity ratio).

The transfer rate to be used will be determined by the financial institution, perhaps a rate treatment already established, and probably a pool rate. Rather than calculating a separate equity rate treatment, however, some analysts may prefer using the rate used to fund the asset, to which the equity is assigned (the Cost of Funds rate discussed previously). Of course, equity will only affect NIR for asset balances, and does not apply to liabilities.

Note, for example, that demand deposit accounts (DDAs) are not assets, so do not directly figure into this calculation, but the float on DDAs is an asset, and this float amount (as well as possible added allocated float) must be taken into account if this float appears in the corresponding NIR calculation. Thus, some components of the calculation may be null.

Let:
$AB_{(asset,s,t)}(a)$ = Average Asset Balances of the account a, including any allocated asset balances.
$ER$ = An Equity Ratio.
$R_{equity}$ = A Treatment Rate for equity. Recall, however, that the user may set this equal to the rate used to fund the asset; i.e., the Cost of Funds rate used in the calculation of NIR(a).

Then, the EOAE(a) is the Earnings on Allocated Equity for an account a comprising:

$$EOAE(a)=R_{equity}*ER*\Sigma AB_{(asset,s,t)}(a)$$

where the summation is taken over all asset balances for account a.

Capitol Allocations—Bank of International Settlements (BIS

EOAE Calculation Option 3

| Account-Level Inputs | Account-Level Outputs |
| --- | --- |
| For the Account: Average Asset Balances, including Float and Allocated Balances BIS Balance Type (and BIS Weights) Risk-weighted Capital Ratio | Earnings on Allocated Equity for each Balance |

Note that the Bank for International Settlements (BIS) is located in Basle, Switzerland, and the capital standards are also referred to as the Basle Agreement.

In Option 2, the equity allocation rule incorporates the concept of adjusting the amount of equity assigned to fund the account by the risk associated with the account. The BIS weights are used to calculate a risk-weighted asset amount, to which an equity ratio is then applied.

The BIS weights, agreed to in an international agreement on capital standards called the Basle Agreement, are a way of incorporating credit risk into the measurement of capital adequacy. At a total balance sheet level, these weights are applied to balances of asset categories (government securities, loans secured by property, etc.) to normalize each asset amount to be of equal risk to the bank. The weights are 0% (for cash, government securities and unconditionally cancelable credit commitments), 20% (for deposits held at other banks and short term self-liquidating trade-related contingencies), 50% (for home mortgage loans, note issuance facilities and credit commitments over one year) and 100% (for corporate loans and credit commitments and the bank's fixed assets and real estate). For example, a $100,000 government bond and a $200,000 home mortgage both have a risk weighted asset amount of $100,000. Note that these weights are applied to on-balance sheet assets as well as off-balance sheet assets. Capital adequacy is measured against the risk-weighted asset amounts. The ratio of the Financial Institution's equity and the sum of risk-adjusted asset must meet a risk-weighted capital standard: 4% for Tier 1 (core) capital. 8% for the sum of Tier 1 and Tier 2 (supplemental) capital.

In the Value Analyzer, the BIS weights are being applied at the account level to calculate the amount of equity to be allocated to the account. Based on account features and balance type, using an association rule set by the Financial Institution in the Value Analyzer set-up phase, each account will be mapped to a BIS category and assigned a BIS weight. The user will then enter a suitable Risk Weighted Capital Ratio. Finally, an amount associated with the account is multiplied by the BIS weight (to get the risk-weighted asset amount), and this amount may be the account asset balances, or an account limit, or other value identified by the Financial Institution. For example, BIS may apply to a credit limit for an account or facility, not the balance. The account asset balance may be used as a default based on certain account features, but in other cases it is necessary to allow customer-entered amounts to be used.

The allocated equity amount is the risk-weighted asset amount multiplied by the risk weighted capital ratio. The earnings on allocated equity is the allocated equity amount multiplied by the Treatment rate for equity.

Let:
$Amt(a)$ = An amount related to an account a.
$BIS(a)$ = A code needed to identify the BIS weight for the account a balances.
$W(BIS(a))$ = A weight determined by the regulatory standards, e.g., a BIS weight determined by the BIS(a) code.
Cap Ratio = An appropriate risk-weighted capital ratio chosen by the Financial Institution (such as Tier 1 or Tier 2).
$R_{equity}$ = A Treatment Rate for equity. Recall, however, that the user may set this equal to the rate used to fund the asset; i.e., the Cost of Funds rate used in the calculation of NIR(a).

Then, the EOAE(a) is the Earnings on Allocated Equity for an account a comprising:

$$EOAE(a)=R_{equity}*\Sigma[Amt(a)*W(BIS(a))*Cap\ Ratio]$$

where the summation is taken over all balances of an account a, if there are multiple amounts.

Note that, with regard to Amt(a) above, there are new data required that may not be available at the account level. These new data items are credit limits and collateral/security. Pre-Value Analyzer database population work must associate these data with an account to implement these continuum calculations. This task is complicated by the use of "facilities" or groups of accounts having a common credit limit or having common collateral. It is usual for banks to have "pseudo" or consolidation accounts for this purpose. Business rules implemented in pre-Value Analyzer processing must be developed to allocate these amounts to the account level consistent with the Value Analyzer calculations so as not to miscalculate profitability. This may be the average asset balances of the account a ($AB_{(asset,s,t)}(a)$ in previous notation), including any allocated asset balances, or may be an account credit limit, etc.

Capitol Allocations—Economic Equity Allocation

EOAE Calculation Option 4

Economic equity allocation to the account level is the approach supported in Options 3 and 4. In these two options, the Value Analyzer uses a method for generating interest rate "random walks" by means of a Monte Carlo modeling technique.

These options exhibit a different aspect of the Value Analyzer with respect to data mining. In this use, the Monte Carlo modeling technique is used to estimate the risk of an account grouping (cohort), and then using financial theory, to estimate the cost of capital or leverage ratio required to adjust profitability measures for economic risk. This statistical modeling functionality is included in the Value Analyzer for Financial Institutions that choose to adjust account based measures for risk using allocations of equity (the objective of NIR(b)) based on economic factors.

The mathematical foundation for this economic equity allocation approach comprises risk models and techniques, such as RiskMetrics™, CreditMetrics™, and/or the Financial Institution's own risk models and techniques. Reuters now owns the source information required for some RiskMetrics™ tools and provides the data daily to Internet users for free. The data for CreditMetrics™ comes from the data in the relational database necessary for advanced and breakthrough Risk Provision. In one embodiment, the Value Analyzer supports a Monte Carlo modeling technique for Earnings at Risk at a branch or product level.

The Value Analyzer uses this valuation process or the Financial Institution's own risk modeling approach to generate the parameters required for the economic equity allocation required in NIR(b).

There are three analytical steps required to incorporate economic equity allocation effects into NIR, the first two of which are external to the Value Analyzer:

The Financial Institution will partition accounts with the goal of classifying accounts into cohorts with common risk characteristics.

The Financial Institution will then use their own modelling tools to calculate an equity allocation parameters for each of the risk cohorts that have been defined previously. These figures will be a constant plus the equity allocation percent of average balance to be applied at the account level for each account in the cohort. Both the constant and the percentage will vary by cohort.

The equity allocation parameters generated in the previous step are used in the Value Analyzer processing to calculate the adjustment to NIR due to allocated equity. The Value Analyzer will allow the user to define each cohort, based on product and account features, and input the constant and multiplier for each cohort. The allocated equity amount is calculated for each account and multiplied by the Treatment Rate for equity to get the adjustment to NIR for Earnings on Allocated Equity.

The calculation of EOAE is given by the following.

| Account-Level Inputs | Account-Level Outputs |
| --- | --- |
| For the Account: Amount(s) related to the Account, such as Average Asset Balances (including Float and Allocated Balances) For a Cohort of Accounts: | Earnings on Allocated Equity for each Balance |
| Rule of membership Equity allocation rule (simple function) Treatment Rate$_{equity}$ = R$_{equity}$ Cash flow uncertainty function | |

The Amounts related to the Account may be the minimum balance during the period, for example, or a credit limit on the account, or other value which is integral with the financial risk related to the account. This is set up as a rule which is consistent across the cohort, and may be determined by such values as account type, product type, balance type, etc.

The cash flow uncertainty function includes all uncertainty of principal flows: risk of default, fee payments, delinquency, etc. This is optional, within Option 4, depending on the credit metrics dimensions of the cohort determinations and equity allocations.

| | |
| --- | --- |
| Let: | |
| Amt(a) = | An amount related to the account a, such as average balances of the account (denoted AB$_{(c,s,t)}$(a)), or absolute value of the minimum (or maximum) of the daily balances for the period, or credit limit on the account, etc. |
| Cohort(a) = | A cohort of accounts in which account a is a member. |
| E$_{cohort}$(a) = | An equity allocation rule for the cohort of account a. This is a linear (two-valued) function that operates on Amt(a) of the form: $\alpha + \beta^*$Amt(a). |
| R$_{equity}$ = | A Treatment Rate for equity for the Amt(a) values. Recall, however, that the user may set this equal to the rate used to fund the asset; i.e., the Cost of Funds rate used in the calculation of NIR(a). |

Then, the EOAE(a) is the Earnings on Allocated Equity for an account a comprising:

$$EOAE(a) = \sum R_{equity} * E_{cohort}(a)(\text{Amt}(a))$$
$$= \sum R_{equity} * [\alpha + \beta * \text{Amt}(a)]$$

where summation occurs if Amt(a) is a set of values for an account a (such as the account and allocated balances of the account a).

Note that there are new data required that may not be available at the account level. These new data items are credit limits and collateral/security. Pre-Value Analyzer database population must associate these data with an account to implement these continuum calculations. This task is complicated by the use of "facilities" or groups of accounts having a common credit limit or having common collateral. It is usual for banks to have "pseudo" or consolidation accounts for this purpose. Business rules implemented in pre-Value Analyzer processing must be developed to allocate these amounts to the account level consistent with the Value Analyzer calculations so as not to miscalculate profitability.

Note also that if Amt(a) is the asset balances of the account and $\beta$=the book equity value, then this results in the Option 2 equation; if the cohorts are based on BIS groups with $\alpha$ the corresponding BIS equity allocation value (in this case, a multiplication of the weight and cap ratio), the Option 3 rule is obtained. Setting $\alpha,\beta=0$ results in Option 1.

Logic of the Preferred Embodiment

Figure 3:
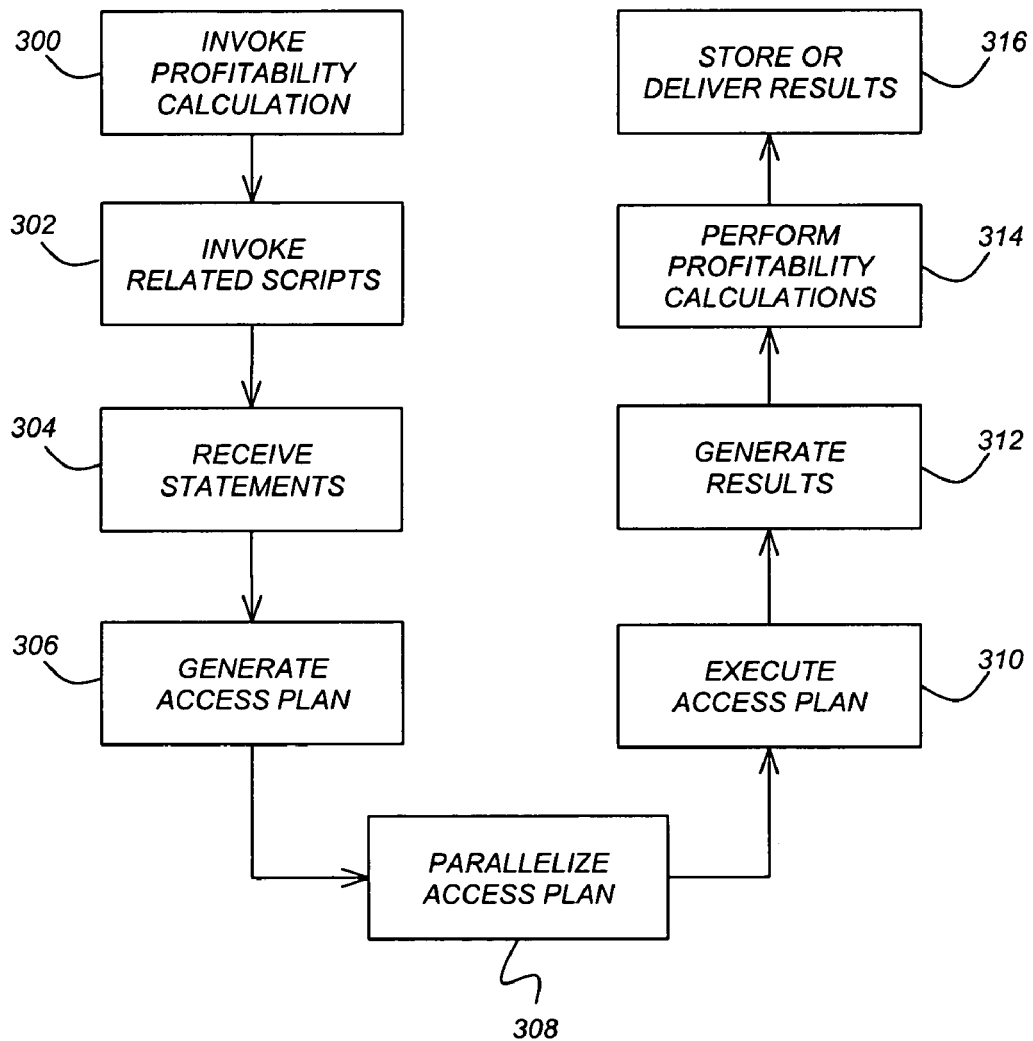
FIG. 3 is a flow chart illustrating the steps necessary for the execution of Profitability Calculations according to the preferred embodiment of the present invention.

FIG. 3 is a flow chart illustrating the steps necessary for the execution of Profitability Calculations 200 according to the preferred embodiment of the present invention. Those skilled in the art will recognize that this logic is provided for illustrative purposes only and that different logic may be used to accomplish the same results.

Block 300 represents the Value Analyzer Client 102 invoking one or more Profitability Calculations 200 in the Value Analyzer Calculation Engine 104.

Block 302 represents the Value Analyzer Calculation Engine 104 invoking one or more scripts related to the invoked Profitability Calculations 200, wherein the scripts comprise SQL statements that are transmitted to the RDBMS 106. These SQL statements access account, event and organization attributes from the database managed by the RDBMS 106.

Block 304 represents the Parsing Engine 108 of the RDBMS 106 receiving the SQL statements and transforming the statements into an operator tree.

Block 306 represents the Parsing Engine 108 of the RDBMS 106 generating one or more access plans from the operator tree.

Block 308 represents the Parsing Engine 108 of the RDBMS 106 parallelizing the access plans, and then transmitting the access plans to their assigned Access Module Processors 110A-E of the RDBMS 106.

Block 310 represents the Access Module Processors 110A-E of the RDBMS 106 performing the required data manipulation associated with the access plans received from the Parsing Engine 108, wherein the access plans are performed in parallel by the Access Module Processors 110A-E.

Block 312 represents the Parsing Engine 108 of the RDBMS 106 merging the results received from the Access Module Processors 110A-E and providing the merged results to the Value Analyzer Calculation Engine 104 as account, event and organization attributes.

Block 314 represents the Value Analyzer Calculation Engine 104 performing the invoked Profitability Calculations 200 using the account, event and organization attributes accessed from the RDBMS 106, as well as one or more profit factors and one or more rules. In this Block, the Profitability Calculations 200 comprise:

| Profit (a) | = | Net Interest Revenue (NIR) (a) |
|---|---|---|
| | + | Other Revenue (OR) (a) |
| | − | Direct Expense (DE) (a) |
| | − | Indirect Expense (IE) (a) |
| | − | Risk Provision (RP) (a) | for an account $a_i$. This is described in more detail in FIG. 4 below.

Block 316 represents the Value Analyzer Calculation Engine 104 delivering the output or results from the invoked Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Calculation Engine 104, or other computer programs, as desired.

Figure 4:
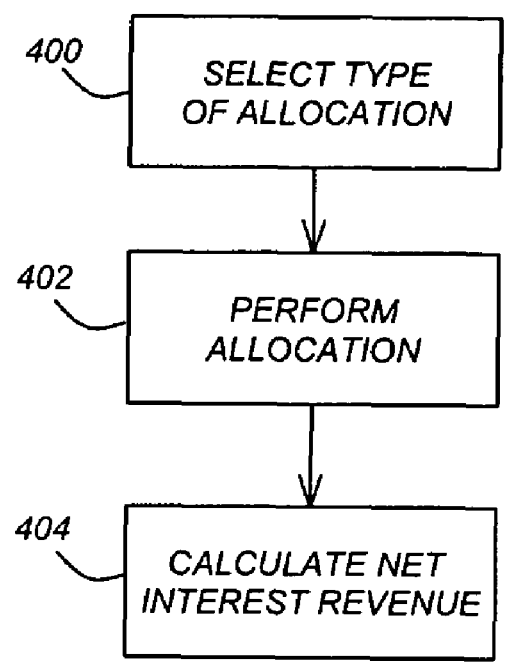
FIG. 4 is a flow chart further illustrating the steps necessary for the execution of Profitability Calculations according to the preferred embodiment of the present invention.

FIG. 4 is a flow chart further illustrating the steps necessary for the execution of Profitability Calculations 200 according to the preferred embodiment of the present invention. Specifically, FIG. 4 describes the steps of Block 314 in more detail. Those skilled in the art will recognize that this logic is provided for illustrative purposes only and that different logic may be used to accomplish the same results.

Block 400 represents the Value Analyzer Calculation Engine 104 selecting a type of allocation for the Earnings on Allocated Equity. More specifically, the Earnings on Allocated Equity are allocated to the accounts using an option selected from a group comprising: (1) no allocation of equity; (2) an allocation of equity based on a simple equity ratio with no allowance for equity risk; (3) an allocation of equity for all assets following one or more regulatory standards; and (4) an allocation of equity using an external economic allocation rule, based on account cohorts and a capital asset pricing model.

Block 402 represents the Value Analyzer Calculation Engine 104 performing the allocation for the Earnings on Allocated Equity, based on the selected type. This is described in more detail below.

With regard to option (1), there is no allocation of equity.

With regard to option (2), the allocation of equity based on the simple equity ratio with no allowance for equity risk comprises:

$$EOAT(a) = R_{equity} * ER * \Sigma AB_{(asset,s,t)}(a)$$

wherein the summation is taken over all asset balances of an account a, and:

| EOAE(a) = | Earnings on Allocated Equity for the account a, |
|---|---|
| $AB_{(asset,s,t)}(a)$ = | Average Asset Balances of the account a, including any allocated asset balances, |
| ER = | an Equity Ratio, and |
| $R_{equity}$ = | a Treatment Rate for equity. |

With regard to option (3), the allocation of equity for all assets following regulatory standards comprises:

$$EOAT(a) = R_{equity} * \Sigma[Amt(a) * W(BIS(a)) * Cap\ ratio]$$

wherein the summation is taken over all balances of an account a, and:

| EOAE(a) = | Earnings on Allocated Equity for account a, |
|---|---|
| Amt(a) = | an amount related to the account a, |
| W(BIS(a)) = | a weight determined by a regulatory standard, |
| Cap Ratio = | a risk-weighted capital ratio, and |
| $R_{equity}$ = | a Treatment Rate for equity. |

With regard to option (4), the allocation of equity using the external economic allocation rule, based on account cohorts and the capital asset pricing model comprises:

$$EOAE(a) = \sum R_{equity} * E_{cohort}(a)(Amt(a))$$
$$= \sum R_{equity} * [\alpha + \beta * Amt(a)]$$

wherein the summation occurs if Amt(a) is a set of values for an account a, such as the account and allocated balances of the account, and:

| | |
|---|---|
| EOAE(a) = | Earnings on Allocated Equity for the account a, |
| Amt(a) = | an amount related to the account a, |
| Cohort(a) = | a cohort of accounts in which the account a is a member, |
| $E_{cohort}(a)$ = | an equity allocation rule for the cohort of the account a that comprises a linear function: $\alpha + \beta * \text{Amt}(a)$, |
| $R_{equity}$ = | a Treatment Rate for equity. |

Block 404 represents the Value Analyzer Calculation Engine 104 calculating the Net Interest Revenue (NIR) as:

| | | |
|---|---|---|
| NIR | = | Intetest Revenue |
| | − | Cost of Funds |
| | + | Value of Funds |
| | − | Interest Expense |
| | + | Earnings on Allocated Equity (EOAE) | wherein the Earnings on Allocated Equity includes an identification of how much equity to allocate to the accounts, and one or more rates used in the calculation of the NIR due to the allocation.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer, which is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

In this calculation, the Net Interest Revenue (NIR) comprises:

| | | |
|---|---|---|
| NIR | = | Interest Revenue |
| | − | Cost of Funds |
| | + | Value of Funds |
| | − | Interest Expense |
| | + | Earnings on Allocated Equity |

The Earnings on Allocated Equity includes an identification of how much equity to allocate to the accounts, and one or more rates used in the calculation of the NIR due to the allocation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in a computer, comprising:
    (a) accessing account, event and organization attributes from a database accessible by the computer, wherein:
    (1) the account attributes comprise data about accounts being measured, (2) the event attributes comprise data about account-related transactions, and (3) the organization attributes comprise data about the organization's financial status;
    (b) performing one or more profitability calculations in the computer using the account, event and organization attributes accessed from the database, as well as one or more profit factors and one or more rules, wherein the profitability calculations include:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

(c) wherein the Net Interest Revenue (NIR) is calculated as:

| | | |
|---|---|---|
| NIR | = | Intetest Revenue |
| | − | Cost of Funds |
| | + | Value of Funds |
| | − | Interest Expense |
| | + | Earnings on Allocated Equity (EOAE); |

(d) wherein the Earnings on Allocated Equity includes an identification of how much equity to allocate to the accounts, and one or more rates used in the calculation of the NIR due to the allocation.

2. The method of claim 1, wherein the Earnings on Allocated Equity are allocated to the accounts using an option selected from a group comprising:
    (1) no calculation of the Earnings on Allocated Equity;
    (2) a calculation of the Earnings on Allocated Equity based on a simple equity ratio with no allowance for equity risk;

(3) an allocation of equity for all assets following one or more regulatory standards; and
(4) an allocation of equity using an external economic allocation rule, based on account cohorts and a capital asset pricing model.

3. The method of claim 2, wherein the allocation of equity based on the simple equity ratio with no allowance for equity risk comprises:

$$EOAE(a)=R_{equity}*ER*\Sigma AB_{(asset,s,t)}(a)$$

wherein the summation is taken over all asset balances for an account a, and:

| | |
|---|---|
| EOAE(a) = | Earnings on Allocated Equity for the account a, |
| $AB_{(asset,s,t)}(a)$ = | Average Asset Balances of the account a, including any allocated asset balances, |
| ER = | an Equity Ratio, and |
| $R_{equity}$ = | a Treatment Rate for equity. |

4. The method of claim 2, wherein the allocation of equity for all assets following regulatory standards comprises:

$$EOAT(a)=R_{equity}*\Sigma[Amt(a)*W(BIS(aa))*Cap\ Ratio]$$

wherein the summation is taken over all balances of an account a, and:

| | |
|---|---|
| EOAE(a) = | Earnings on Allocated Equity for the account a, |
| Amt(a) = | an amount relaxed to the account a, |
| W(BIS(a)) = | a weight determined by the regulatory standard, |
| Cap Ratio = | a risk-weighted capital ratio, and |
| $R_{equity}$ = | a Treatment Rate for equity. |

5. The method of claim 2, wherein the allocation of equity using the external economic allocation rule, based on account cohorts and the capital asset pricing model, comprises:

$$EOAE(a) = \sum R_{equity} * E_{cohort}(a)(Amt(a))$$
$$= \sum R_{equity} * [\alpha + \beta * Amt(a)]$$

wherein the summation occurs if Amt(a) is a set of values for an account a, such as the account and allocated balances of the account, and:

| | |
|---|---|
| EOAE(a) = | Earnings on Allocated Equity for the account a, |
| Amt(a) = | an amount related to the account a, |
| Cohort(a) = | a cohort of accounts in which the account a is a member, |
| $E_{cohort}(a)$ = | an equity allocation rule for the cohort of the account a that is a linear function: $\alpha + \beta * Amt(a)$, and |
| $R_{equity}$ = | a Treatment Rate for equity. |

6. A system for financial processing, comprising:
a computer;
logic, performed by the computer, for:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;

(b) performing one or more profitability calculations in the computer using the account, event and organization attributes accessed from the database, as well as one or more profit factors and one or more rules, wherein the profitability calculations include:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

(c) wherein the Net Interest Revenue (NIR) is calculated as:

| | | |
|---|---|---|
| NIR | = | Intetest Revenue |
| | − | Cost of Funds |
| | + | Value of Funds |
| | − | Interest Expense |
| | + | Earnings on Allocated Equity (EOAE); |

(d) wherein the Earnings on Allocated Equity includes an identification of how much equity to allocate to the accounts, and one or more rates used in the calculation of the NIR due to the allocation.

7. The system of claim 6, wherein the Earnings on Allocated Equity are allocated to the accounts using an option selected from a group comprising:
(1) no calculation of the Earnings on Allocated Equity;
(2) a calculation of the Earnings on Allocated Equity based on a simple equity ratio with no allowance for equity risk;
(3) an allocation of equity for all assets following one or more regulatory standards; and
(4) an allocation of equity using an external economic allocation rule, based on account cohorts and a capital asset pricing model.

8. The system of claim 7, wherein the allocation of equity based on the simple equity ratio with no allowance for equity risk comprises:

$$EOAE(a)=R_{equity}*ER*\Sigma AB_{(asset,s,t)}(a)$$

wherein the summation is taken over all asset balances for an account a, and:

| | |
|---|---|
| EOAE(a) = | Earnings on Allocated Equity for the account a, |
| $AB_{(asset,s,t)}(a)$ = | Average Asset Balances of the account a, including any allocated asset balances, |
| ER = | an Equity Ratio, and |
| $R_{equity}$ = | a Treatment Rate for equity. |

9. The system of claim 7, wherein the allocation of equity for all assets following regulatory standards comprises:

$$EOAE(a)=R_{equity}*\Sigma[Amt(a)*W(BIS(a))*Cap\ Ratio]$$

wherein the summation is taken over all balances of an account a, and:

| | |
|---|---|
| EOAE(a) = | Earnings on Allocated Equity for the account a, |
| Amt(a) = | an amount related to the account a, |
| W(BIS(a)) = | a weight determined by the regulatory standard, |

| | |
|---|---|
| Cap Ratio = | a risk-weighted capital ratio, and |
| $R_{equity}$ = | a Treatment Rate for equity. |

10. The system of claim 7, wherein the allocation of equity using the external economic allocation rule, based on account-cohorts and the capital asset pricing model, comprises:

$$EOAE(a) = \sum R_{equity} * E_{cohort}(a)(\text{Amt}(a))$$
$$= \sum R_{equity} * [\alpha + \beta * \text{Amt}(a)]$$

wherein the summation occurs if Amt(a) is a set of values for an account a, such as the account and allocated balances of the account, and:

| | |
|---|---|
| EOAE(a) = | Earnings on Allocated Equity for the account a, |
| Amt(a) = | an amount related to the account a, |
| Cohort(a) = | a cohort of accounts in which the account a is a member, |
| $E_{cohort}(a)$ = | an equity allocation rule for the cohort of the account a that is a linear function: $\alpha + \beta * \text{Amt}(a)$, and |
| $R_{equity}$ = | a Treatment Rate for equity. |

11. An article of manufacture embodying logic for performing financial processing in a computer, comprising:
  (a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
  (b) performing one or more profitability calculations in the computer using the account, event and organization attributes accessed from the database, as well as one or more profit factors and one or more rules, wherein the profitability calculations include:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

(c) wherein the Net Interest Revenue (NR) is calculated as:

| | | |
|---|---|---|
| NIR | = | Interest Revenue |
| | − | Cost of Funds |
| | + | Value of Funds |
| | − | Interest Expense |
| | + | Earnings on Allocated Equity (EOAE); |

(d) wherein the Earnings on Allocated Equity includes an identification of how much equity to allocate to the accounts, and one or more rates used in the calculation of the NIR due to the allocation.

12. The article of manufacture of claim 11, wherein the Earnings on Allocated Equity are allocated to the accounts using an option selected from a group comprising:
  (1) no calculation of the Earnings on Allocated Equity;
  (2) a calculation of the Earnings on Allocated Equity based on a simple equity ratio with no allowance for equity risk;
  (3) an allocation of equity for all assets following one or more regulatory standards; and
  (4) an allocation of equity using an external economic allocation rule, based on account cohorts and a capital asset pricing model.

13. The article of manufacture of claim 12, wherein the allocation of equity based on the simple equity ratio with no allowance for equity risk comprises:

$$EOAE(a) = R_{equity} * ER * \Sigma AB_{(asset,s,t)}(a)$$

wherein the summation is taken over all asset balances for an account a, and:

| | |
|---|---|
| EOAE(a) = | Earnings on Allocated Equity for the account a, |
| $AB_{(asset,s,t)}(a)$ = | Average Asset Balances of the account a, including any allocated asset balances, |
| ER = | an Equity Ratio, and |
| $R_{equity}$ = | a Treatment Rate for equity. |

14. The article of manufacture of claim 12, wherein the allocation of equity for all assets following regulatory standards comprises:

$$EOAE(a) = R_{equity} * \Sigma[\text{Amt}(a) * W(BIS(a)) * \text{Cap Ratio}]$$

wherein the summation is taken over all balances of an account a, and:

| | |
|---|---|
| EOAE(a) = | Earnings on Allocated Equity for the account a, |
| Amt(a) = | an amount related to the account a, |
| W(BIS(a)) = | a weight determined by the regulatory standard, |
| Cap Ratio = | a risk-weighted capital ratio, and |
| $R_{equity}$ = | a Treatment Rate for equity. |

15. The article of manufacture of claim 12, wherein the allocation of equity using the external economic allocation rule, based on account cohorts and the capital asset pricing model, comprises:

$$EOAE(a) = \sum R_{equity} * E_{cohort}(a)(\text{Amt}(a))$$
$$= \sum R_{equity} * [\alpha + \beta * \text{Amt}(a)]$$

wherein the summation occurs if Amt(a) is a set of values for an account a, such as the account and allocated balances of the account, and:

| | |
|---|---|
| EOAE(a) = | Earnings on Allocated Equity for the account a, |
| Amt(a) = | an amount related to the account a, |
| Cohort(a) = | a cohort of accounts in which the account a is a member, |
| $E_{cohort}(a)$ = | an equity allocation rule for the cohort of the account a that is a linear function: $\alpha + \beta * \text{Amt}(a)$, and |
| $R_{equity}$ = | a Treatment Rate for equity. |

* * * * *

UNITED STATES PATENT AND TRADEMARK OFFICE
CERTIFICATE OF CORRECTION

PATENT NO. : 7,263,503 B1  Page 1 of 1
APPLICATION NO. : 09/943060
DATED : August 28, 2007
INVENTOR(S) : Paul Phibbs It is certified that error appears in the above-identified patent and that said Letters Patent is hereby corrected as shown below:

Item [57] In the Abstract 2nd paragraph
After "Indirect Expense" delete "(TE)" insert --(IE)--

Column 19, Line 23, claim 4 after "*W (BIS" delete "(aa)" insert --(a)--
Column 19, Line 29, claim 4 after "an amount" delete "relaxed" insert --related--
Column 21, Line 53, claim 11 after "Interest Revenue" delete "(NR)" insert --(NIR)--

Signed and Sealed this

Fourth Day of December, 2007

JON W. DUDAS
*Director of the United States Patent and Trademark Office*